United States Patent [19]
Choi

[11] Patent Number: 5,131,013
[45] Date of Patent: Jul. 14, 1992

[54] ASYNCHRONOUS-SYNCHRONOUS DIGITAL TRANSMISSION SIGNAL CONVERSION

[75] Inventor: DooWhan Choi, Salem, N.H.

[73] Assignee: AT&T Bell Laboratories, Murray Hill, N.J.

[21] Appl. No.: 530,775

[22] Filed: May 30, 1990

[51] Int. Cl.⁵ .................. H04L 7/04; H04L 25/36
[52] U.S. Cl. .................. 375/118; 375/112; 370/102; 369/60
[58] Field of Search .................. 375/118, 120, 112; 370/102, 105, 3; 360/51, 52, 70; 369/60

[56] References Cited

U.S. PATENT DOCUMENTS

| | | | |
|---|---|---|---|
| 4,667,324 | 5/1987 | Graves | 370/102 |
| 4,884,268 | 11/1989 | Goto | 370/102 |
| 4,928,275 | 5/1990 | Moore et al. | 375/118 X |

OTHER PUBLICATIONS

American National Standard for Telecommunications, "Digital Hierarchy Optical Interface Rates and Formats Specifications (SONET)", dated Feb. 1990.
Technical Advisory, TA-TSY-000253. Issue 4, "Sonet Transport Systems: Common Generic Criteria", Bell Communications Research, Feb. 1989.
Globecom'85, IEEE Global Telecommunications Conference, Conference Record vol. 3 of 3, "SONET (Synchronous Optical Network)", R. J. Roehm et al., pp. 1443-1450.

*Primary Examiner*—Benedict V. Safourek
*Assistant Examiner*—Tesfaldet Bocure
*Attorney, Agent, or Firm*—T. Stafford

[57] ABSTRACT

Asynchronous-synchronous digital signal conversion and vice versa are realized by employing a single synchronizing elastic store and associated phase detector. The signal smoothing and synchronization processes are achieved with a single elastic store by low pass filtering the elastic store write-read address separation signal from the phase detector to obtain a smooth stuff control signal. In turn, the smooth stuff control signal is employed to make a stuff decision for controlling the elastic store read clock signal. In a specific embodiment the low pass filtering is realized by first synchronously sampling the write-read address separation signal and, then, employing a digital low pass filter to obtain the aliasing free smooth stuff control signal.

30 Claims, 4 Drawing Sheets

ASYNCHRONOUS-SYNCHRONOUS DIGITAL TRANSMISSION SIGNAL CONVERSION

CROSS-REFERENCE TO RELATED APPLICATION

U.S. patent application Ser. No. 07/530,774 was filed concurrently herewith.

TECHNICAL FIELD

This invention relates to digital transmission systems and, more particularly, to converting asynchronous digital signals to synchronous digital signals and vice versa.

BACKGROUND OF THE INVENTION

Prior techniques and arrangements for converting asynchronous digital transmission signals to synchronous digital transmission signals, and vice versa, typically required a so-called "clock smoothing phase locked loop" and an associated elastic store unit to smooth gaps in a demultiplexed digital signal, for example, the DS1 digital signal. The smooth signal is then converted to a desired digital signal format, for example, the SONET VT signal, by employing an additional synchronizing elastic store unit and associated phase detector which generates a stuff control signal for the desired format. One such prior arrangement is shown in FIG. 1 and described below. Thus, when converting between, for example, the DS3 digital transmission signal and a synchronous digital transmission signal, for example, the SONET STS1 digital transmission signal using the prior techniques and arrangements would require a large number, for example, 56 phase locked loops and 56 associated elastic store units, to realize the clock smoothing. Additionally, the prior techniques and arrangements which required the use of a clock smoothing additional elastic store unit introduced an unnecessary time delay through the smoothing process.

SUMMARY OF THE INVENTION

These and other problems of prior digital signal conversion arrangements are overcome, in accordance with the invention, by advantageously employing a single elastic store unit and associated phase detector to combine both clock smoothing and digital signal synchronization processes.

More specifically, the clock smoothing and digital signal synchronization are realized using a single elastic store by low pass filtering the elastic store write and read address separation output from the phase detector to generate a smooth stuff control signal. The smooth stuff control signal is used to make a stuff decision which, in turn, is employed to control a read clock signal being supplied to the elastic store in order to obtain digital synchronization. In one exemplary embodiment, the low pass filtering is realized by first sampling the phase detector write-read address separation output at a prescribed sampling rate and, then, digitally low pass filtering the sampled phase detector output to generate a smooth stuff control signal. In turn, the smooth stuff control signal is used to generate an appropriate stuff decision. The sampling rate is selected to be "high" enough so that jitter aliasing is minimized, and also to be synchronous with either the read or write clock rate whichever one contains more clock gaps due to overhead in its format.

Technical advantages of the invention are that the clock smoothing phase locked loop and associated elastic store unit required in prior arrangements are eliminated and any unnecessary time delay for the clock smoothing process is minimized.

DETAILED DESCRIPTION

Figures 1, 3:
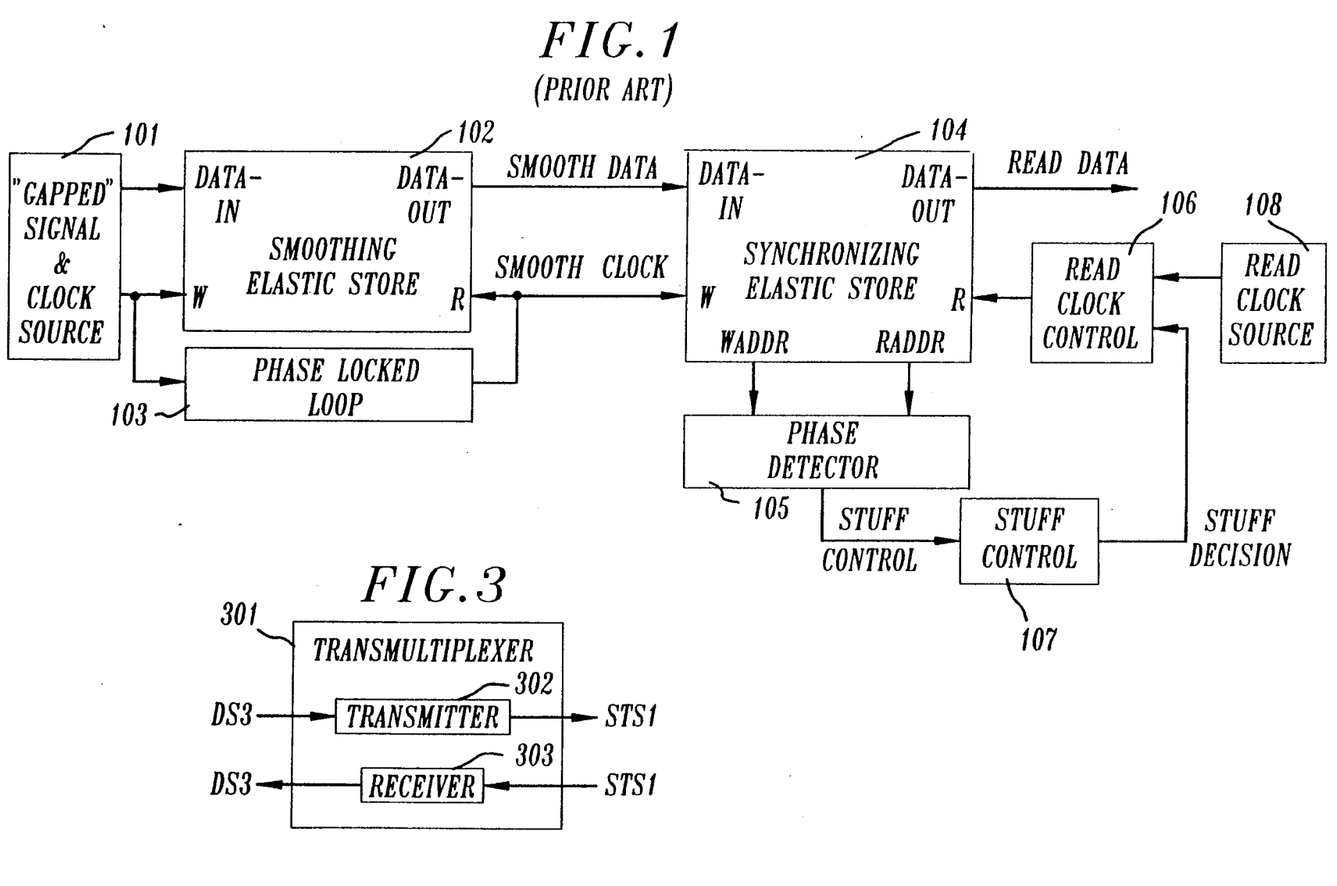
FIG. 1 shows details of a prior art arrangement for realizing asynchronous-synchronous digital signal conversion useful in explaining the invention.
FIG. 3 shows in simplified form a transmultiplexer in which the invention may be advantageously utilized.

FIG. 1 shows, in simplified block diagram form, details of a typical prior art arrangement for converting asynchronous digital signals to synchronous digital signals and vice versa. Accordingly, shown are so-called "gapped" signal and clock source 101, smoothing elastic store 102 and associated phase locked loop 103, synchronizing elastic store 104 and associated phase detector 105, read clock control 106, stuff control 107 and read clock source 108. Gapped signal and clock source 101 may yield a so-called gapped DS1 digital signal and associated clock signal. Such a DS1 signal and clock signal are realized by, for example, demultiplexing an asynchronous DS3 digital signal. Gaps result in the DS1 digital signal and associated clock signal because of the removal of overhead bits and stuff bits in the demultiplexing process, i.e., DS3 to DS2 to DS1. Similarly, if a synchronous signal, for example, the SONET STS1 signal, is demultiplexed and deformatted, the resulting DS1 digital signal (which is the VT payload) and associated clock signal would also have gaps caused by STS1 and VT overhead bit removal, VT stuffing bit removal and VT and STS1 pointer movements. These gaps should be smoothen out prior to conversion. To this end, the gapped data signal is supplied to a data-in input of elastic store 102, and the associated gapped clock signal is supplied to a write (W) input of elastic store 102 and to phase locked loop 103. Phase locked loop 103 is employed in known fashion to yield a so-called smooth version of the clock signal. The smooth clock signal is supplied to a read (R) input of elastic store 102 and to a write (W) input of synchronizing elastic store 104. Thus, the gapped data signal is written into smoothing elastic store 102 via the gapped clock signal and read out via the smooth clock signal to yield a smooth data signal. In turn, the smooth data signal is supplied from the data-out output of elastic store 102 to the data-in input of synchronizing elastic store 104. As is known, bit stuffing is necessary in order to synchronize to a desired output signal format. This is because the synchronous read clock signal being supplied from read clock source 108 via read clock control 106 to the read (R) input of elastic store 104 may be at a different rate than the smooth clock signal being supplied to the write (W) input. Synchronizing elastic store 104 write address WADDR and read address RADDR signals are supplied to phase detector 105. Write address WADDR and read address RADDR are generated in elastic store 104 in response to the smooth clock signal and to an adjusted read clock signal, respectively, in well known fashion. Typically, the write and read address signals are obtained by employing counters (not shown). It will be apparent to those skilled in the art that the write and read address signals could be generated external to elastic store 104 and be supplied to both elastic store 104 and phase detector 105. The write-read address separation signal is representative of the phase difference between the write clock signal and the adjusted read clock signal. To this end, phase detector 105 generates a stuff control signal representative of the phase separation between the write address signal and the read address signal of elastic store 104. Stuff control 107 compares the stuff control signal from phase detector 105 to a predetermined threshold value and generates a stuff decision signal. In turn, the stuff decision signal is supplied to read clock control 106 for controlling the read clock signal being supplied from read clock source 108. In this manner, underflow and overflow are controlled of elastic store 104. The desired read data signal is supplied as read data at the data-out output of elastic store 104. It is noted that elastic store units may be implemented in any of a number of ways, for example, by employing registers, RAM memory units or the like. The use of pulse stuffing is well known, see for example, *Telecommunications Transmission Engineering*, AT&T, Volume 2, 1977, pages 549-561, regarding the known DS1, DS2 and DS3 digital signals. As indicated above, this prior arrangement requires the use of smoothing elastic store 102 and associated phase locked loop 103 to realize the desired conversion. In addition to the required additional apparatus, such a prior arrangement also introduces undesired and unnecessary delay in the conversion process because of the need to temporarily store the data signal in elastic store 102 during the clock signal smoothing process.

Figure 2:
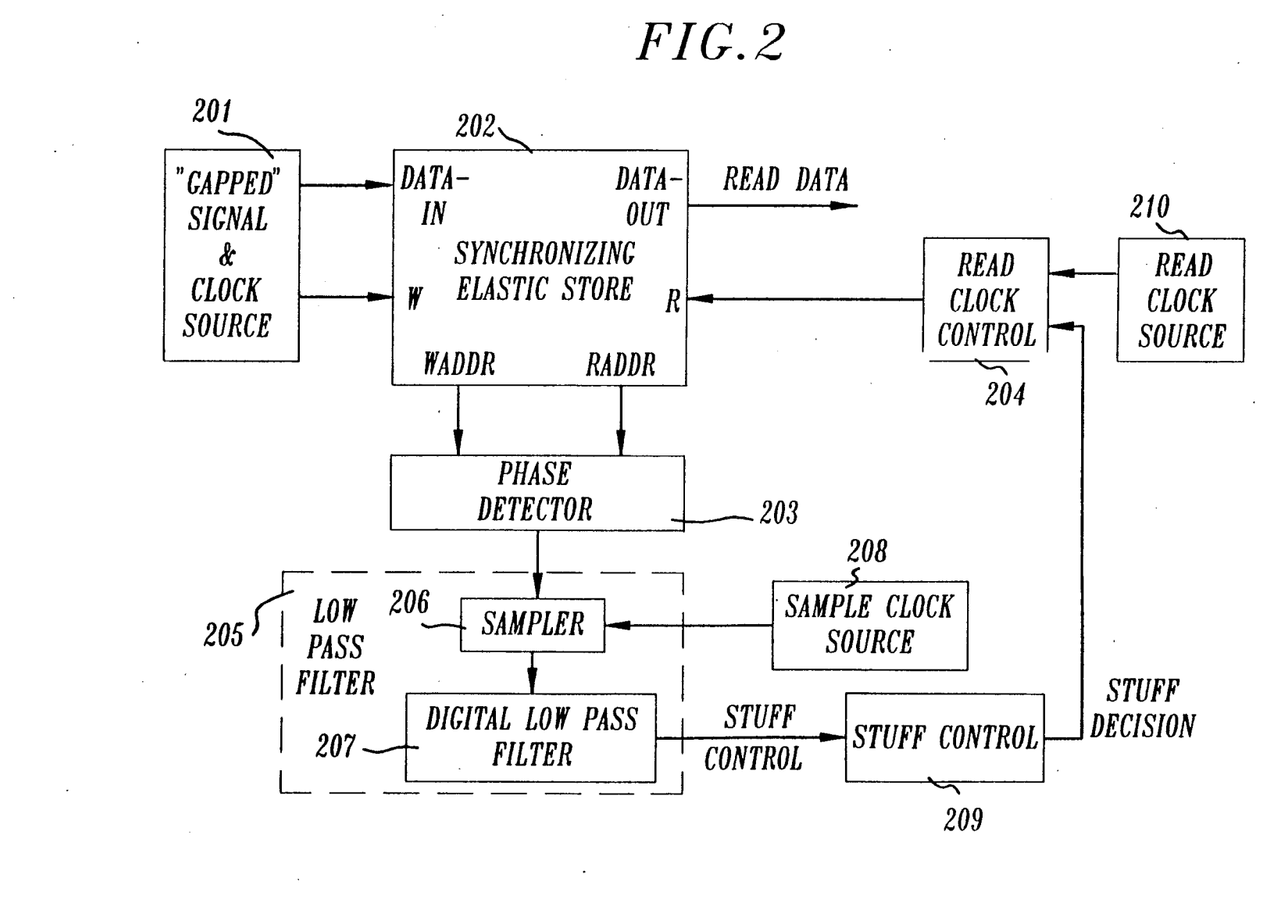
FIG. 2 depicts details of an asynchronous-synchronous digital signal conversion arrangement including an embodiment of the invention.

FIG. 2 shows, in simplified block diagram form, details of an asynchronous-synchronous conversion and vice versa, i.e., synchronization, arrangement including an embodiment of the invention. Accordingly, shown are a so-called "gapped" signal and clock source 201, synchronizing elastic store 202, phase detector 203, read clock control 204, low pass filter 205 including sampler 206 and digital low pass filter 207, sample clock source 208, stuff control 209 and read clock source 210. Thus, the so-called "gapped" data signal and associated "gapped" clock signal are supplied to the data-in input and write (W) input, respectively, of synchronizing elastic store 202. A read clock signal is supplied from read clock source 210 via read clock control 204 to a read (R) input of elastic store 202. Write address signal WARRD and read address signal RARRD are generated, in known fashion, in elastic store 202 in response to the gapped write clock signal and the adjusted read clock signal, respectively, and are supplied to phase detector 203. The desired read data signal is supplied as an output at the data-out output of elastic store 202. Here, as in the prior conversion arrangement, phase detector 203 is employed to generate a write-read address separation signal, i.e., a difference signal, representative of the the phase separation of the write address WARRD and the read address RARRD of elastic store 202. Again, the write-read separation signal is representative of the phase difference between the write clock signal and the adjusted read clock signal. However, in this embodiment of the invention, the so-called "raw" write-read address separation signal cannot be used directly to make a stuff decision because it contains phase "jumps" caused by the gaps in the gapped write clock signal. Such phase "jumps" would impact the stuff decision and also introduce excessive jitter in the desired read data signal. In this embodiment of the invention, low pass filter 205 is employed to smooth the effects of the phase jumps in the write-read address separation signal caused by the gaps in the write clock signal and yields a smooth stuff control signal. The smooth stuff control signal from low pass filter 205 is supplied to stuff control 209 where it is compared to a predetermined threshold value to yield a stuff decision signal. In turn, the stuff decision signal is supplied to read clock control 204 to appropriately control the read clock signal being supplied from read clock source 210.

In a specific embodiment of the invention, low pass filter 205 includes sampler 206 and digital low pass filter 207. The desired low pass filtering of the write-read address separation signal is achieved by first sampling via sampler 206 the write-read address separation signal from phase detector 203 and, then, employing digital low pass filter 207 to yield the desired smooth stuff control signal. Sampler 206 is responsive to a sample clock signal from sample clock source 208 to sample the write-read address separation signal from phase detector 203. It is noted, however, that the sampling rate should be at a "high" enough rate to minimize socalled jitter aliasing. The particular sampling rate employed, of course, is dependent on the particular signals being converted. In one example, not to be construed as limiting the scope of the invention, the sample clock signal rate is selected to be 8 KHz, which is synchronous to the SONET VT frame rate. Jitter aliasing would result if the write-read address separation signal output from phase detector 203 was sampled at a too "low" sampling rate, for example, at the VT stuffing rate of 2 KHz. Digital low pass filter 207 is then employed to filter the sampled write-read address separation signal to smooth out the phase jumps that are caused by the gaps in the gapped write clock signal. To this end, any of a number of digital low pass filters may be employed, e.g., a moving average filter, a random-walk filter or the like. The low pass bandwidth of the filter is set such that the filtered write-read separation signal is acceptably smooth. Again, in the particular example of a DS1 gapped write clock signal and a VT1.5 read clock signal, a so-called moving average digital filter is employed having a transfer function of $$F(z) = \frac{1}{n}(1 + z^{-1} + \ldots z^{-n}),$$

However, other filter arrangements may equally be employed for this or other applications.

FIG. 3 shows, in simplified block diagram form, transmultiplexer 301 including transmitter 302 and receiver 303 for converting an asynchronous digital transmission signal to a synchronous digital transmission signal, and vice versa, which may advantageously employ embodiments of the invention. In this example, transmitter 302 is employed to convert the DS3 digital transmission signal to the SONET STS1 digital signal and receiver 303 is employed to convert the SONET STS1 digital signal to the DS3 digital transmission signal.

Figure 4:
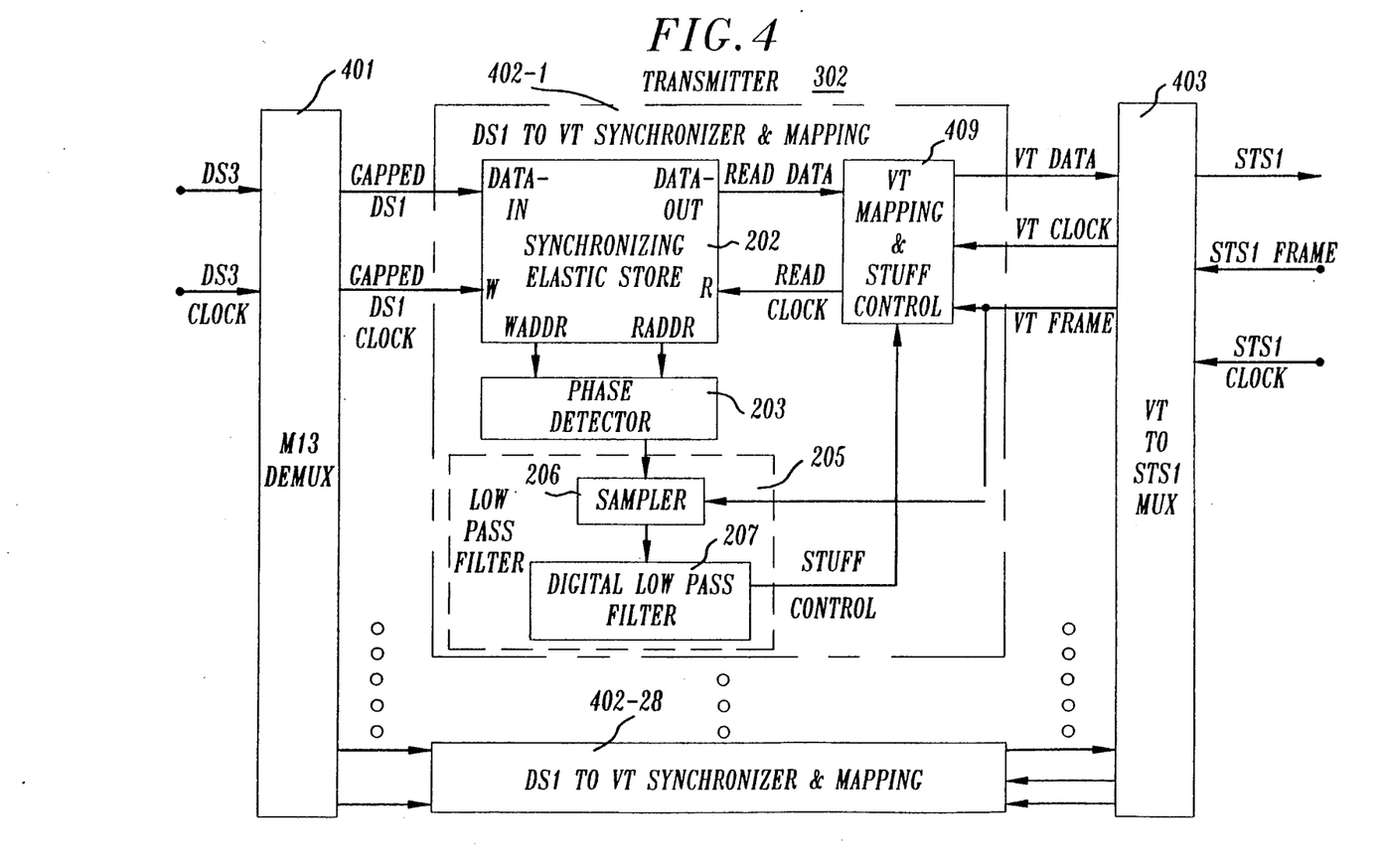
FIG. 4 depicts details of a transmitter including an embodiment of the invention which may be employed in the transmultiplexer of FIG. 3.

FIG. 4 depicts, in simplified block diagram form, details of transmitter 302 of FIG. 3 for converting a DS3 digital transmission signal to a SONET STS1 digital signal. Accordingly, shown is M13 demultiplexer (DEMUX) 401 which demultiplexes a supplied DS3 signal to obtain so-called "gapped" DS1 signals and associated "gapped" DS1 clock signals. As is known, the DS3 digital signal includes 28 DS1 digital signals. The DS1, DS2 and DS3 digital signal formats are described in the *Telecommunications Transmission Engineering*, reference noted above. A DS3 clock signal having a rate of 44.736 Mb/sec is also supplied to M13 DEMUX 401. M13 demultiplexers are known in the art. Each of the 28 obtained gapped DS1 digital signals and its associated gapped DS1 clock signal are supplied to a corresponding one of DS1 to VT synchronizer and mapping units 402-1 through 402-28. Each of DS1 to VT synchronizer and mapping units 402 includes synchronizing elastic store 202, phase detector 203, low pass filter 205 including sampler 206 and digital low pass filter 207, and VT mapping and stuff control 409. The VT data signals from each of DS1 to VT synchronizer and mapping units 402 are supplied to VT to STS1 multiplexer (MUX) 403, which yields a formatted STS1 signal. A VT clock signal and a VT frame signal are supplied from VT to STS1 MUX 403 to each of DS1 to VT synchronizer and mapping units 402 and, therein, to VT mapping and stuff control unit 409. The VT frame signal is also supplied to low pass filter 205 and, therein, to sampler 206. Supplied to VT to STS1 MUX 403 are the STS1 frame signal and the STS1 clock signal. In this example, the SONET VT1.5 digital signal is assumed. As is known, the VT1.5 clock signal rate is 1.728 Mb/sec, the VT1.5 frame signal is 8 KHz, the STS1 clock signal rate is 51.840 Mb/sec and the STS1 frame signal is 8 KHz. The SONET STS1 and VT signal formats are described in a Technical Advisory entitled "SONET Transport Systems: Common Generic Criteria", TA-TSY-000253, Bell Communications Research, February 1989 and the ANSI draft Standard entitled "Digital Hierarchy-Optical Interface Rates and Formats Specifications (SONET)", dated February 1990.

Operation of each of DS1 to VT synchronizer and mapping units 402-1 through 402-28 is to synchronize a corresponding "gapped" DS1 digital signal to, in this example, the VT1.5 digital signal format. To this end, operation of synchronizing elastic store 202, phase detector 203 and low pass filter 205 including sampler 206 and digital low pass filter 207 in generating the stuff control signal is as described above in relationship to FIG. 2 and will not be repeated here. In this example digital low pass filter 207 has a transfer function of $$F(z) = \frac{1}{n} (1 + z^{-1} + \ldots z^{-n}).$$

where n=8. It is noted, however, that the read clock signal, in this example, is derived from the VT clock signal as adjusted in response to the stuff control signal from digital low pass filter 207. Additionally, sampler 206 is responsive to the VT frame signal to sample the "raw" write-read address separation signal output from phase detector 203. In this example, the VT frame signal is 8 KHz and the VT clock signal is 1.728 Mb/sec. Sampling at the synchronous VT frame rate practically eliminates the so-called jitter aliasing, and also eliminates the effect of VT overhead bit insertion on synchronization. Again, digital low pass filter 207 yields a smooth sampled stuff control signal which is employed in VT mapping and stuff control 409 to make a stuff decision in well known fashion. The read data signal from elastic store 202 is mapped into the VT1.5 digital signal format in VT mapping and stuff control 409. In turn, the VT1.5 digital signals from DS1 to VT synchronizer and mapping units 402-1 through 402-28 are multiplexed into a VT-G signal and, then, into a STS1 signal in VT to STS1 MUX 403.

Figure 5:
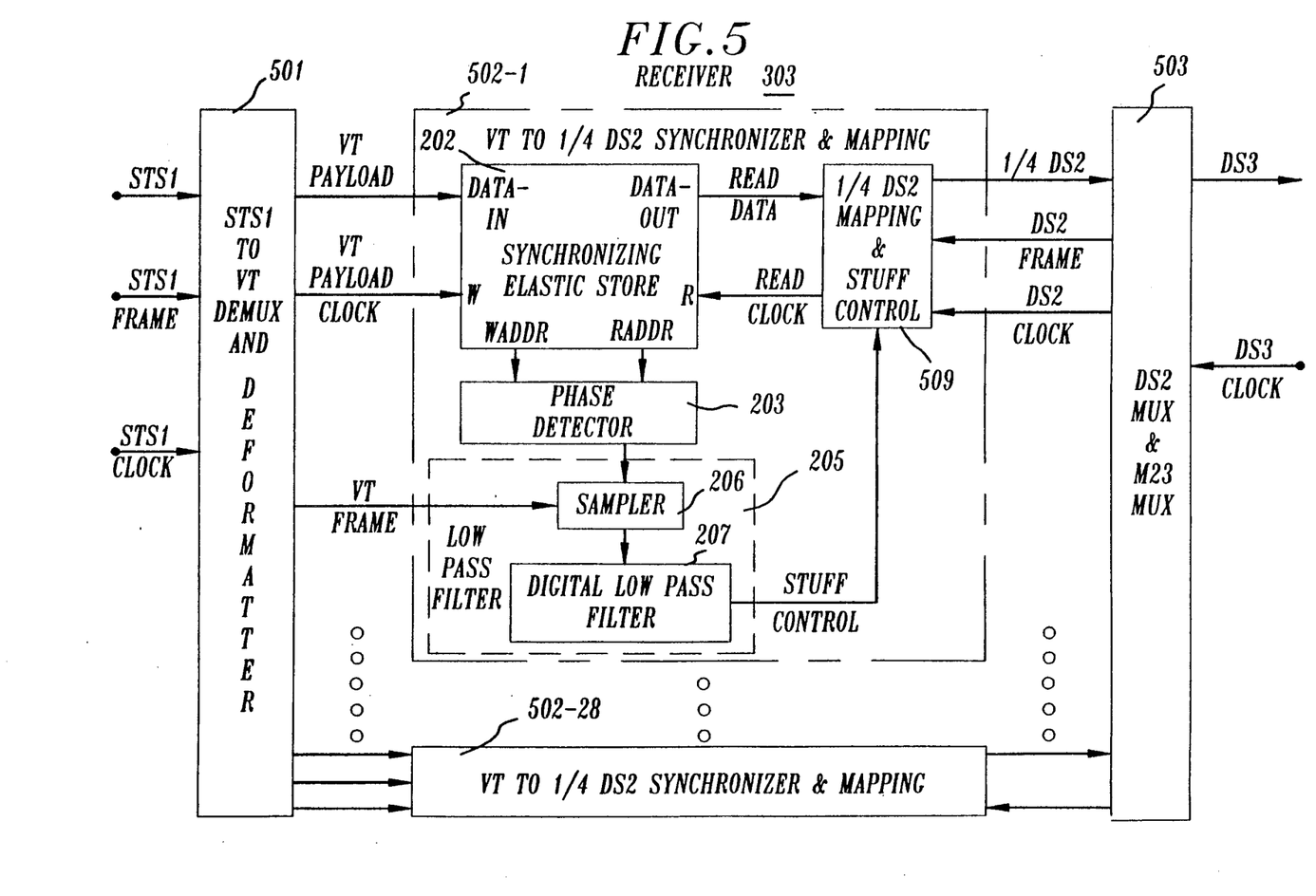
FIG. 5 shows details of a receiver including an embodiment of the invention which may be used in the transmultiplexer of FIG. 3.

FIG. 5 depicts, in simplified block diagram form, details of receiver 303 of FIG. 3 for converting a SONET STS1 digital transmission signal to a DS3 digital signal. Accordingly, shown is STS1 to VT demultiplexer (DEMUX) and deformatter 501 which demultiplexes a supplied STS1 digital signal to obtain a VT-G digital signal. The VT-G digital signal is then deformatted to obtain so-called "gapped" VT payload signals and associated "gapped" VT payload clock signals. In this example 28 such VT payload signals and associated VT payload clock signals are obtained. Additionally, the VT frame signal is obtained in well known fashion. A STS1 frame signal and a STS1 clock signal are also supplied to STS1 to VT DEMUX and deformatter 501. Such STS1 to VT DEMUX and deformatter units are believed to be readily derived from the SONET signal formats described in the aforementioned Technical Advisory TA-TSY-000253 and ANSI draft Standard. Each of the 28 obtained gapped VT payload signals, its associated VT payload clock signal and VT frame signal are supplied to a corresponding one of VT to ¼ DS2 synchronizer and mapping units 502-1 through 502-28. Each of VT to ¼ DS2 synchronizer and mapping units 502 includes synchronizing elastic store 202, phase detector 203, low pass filter 205 including sampler 206 and digital low pass filter 207, and VT to ¼ DS2 mapping and stuff control 509. The ¼ DS2 data signals from each of VT to ¼ DS2 synchronizer and mapping units 502 are supplied to DS2 multiplexer (MUX) and M23 multiplexer (MUX) 503, which yields a formatted DS3 digital signal. A DS2 clock signal and DS2 frame signal are supplied from DS2 MUX and DS3 MUX 503 to each of VT to ¼ DS2 synchronizer and mapping units 502 and, therein, to VT to ¼ DS2 mapping and stuff control unit 509. Note that the VT frame signal is also supplied to low pass filter 205 and, therein, to sampler 206. This is to insure that the jitter aliasing is minimized, and that the fixed frequency synchronous jitter caused by the VT overhead bit removal is eliminated. Also supplied to DS2 MUX and M23 MUX 503 is the DS3 clock signal. (In this example, the SONET VT1.5 digital signal is assumed.)

Operation of each of VT to ¼ DS2 synchronizer and mapping unit 502-1 through 502-28 is to synchronize a corresponding "gapped" VT payload signal, in this example, in the VT1.5 digital signal format, to a portion of a DS2 digital signal, namely, ¼ of the DS2 signal format. It is noted that the DS2 digital signal format includes four (4) DS1 digital signals and appropriate overhead bits. The DS2 digital signal format is also described in the *Telecommunications Transmission Engineering* reference noted above. To this end, operation of synchronizing elastic store 202, phase detector 203 and low pass filter 205 including sampler 206 and digital low pass filter 207 in generating the stuff control signal is as described above in relationship to FIG. 2 and will not be repeated here. In this example, digital low pass filter 207 has a transfer function of $$F(z) = \frac{1}{n}(1 + z^{-1} + \ldots z^{-n}).$$

where n=16. It is noted, however, that the read clock signal, in this example, is derived from the DS2 clock signal as adjusted in response to the stuff control signal from digital low pass filter 207. Specifically, the read clock signal is ¼ the DS2 clock signal bit rate as adjusted in response to the stuff control signal. Additionally, sampler 206 is also responsive to the VT frame signal to sample the "raw" write-read address separation signal output from phase detector 203. Sampling at the synchronous VT frame rate not only minimizes so-called jitter aliasing but also eliminates synchronous jitter caused by VT overhead bit removal. Again, digital low pass filter 207 yields a smooth sampled stuff control signal which is employed in ¼ DS2 mapping and stuff control 509 to make a stuff decision in well known fashion. The read data signal from elastic store 202 is mapped into ¼ of the DS2 digital signal format in ¼ DS2 mapping and stuff control 509. In turn, the ¼ DS2 digital signals from VT to ¼ DS2 synchronizer and mapping units 502-1 through 502-28 are multiplexed into the DS2 digital signal format and, then, into a DS3 signal in DS2 MUX and M23 MUX 503.

Although the invention has been described in terms of so-called "gapped" digital signal conversion, it should be noted that it is equally applicable to conversion of non-gapped digital signals, for example, for non-gapped DS1 to VT mapping. In such a conversion arrangement jitter components resulting from aliasing are also minimized by employing the invention as for the gapped digital signals and by low pass filtering the sampled write-read address separation signal to generate the stuff control signal which is below the Nyquist frequency for the appropriate VT stuffing rate.

I claim:

1. Apparatus for synchronizing a first digital signal to a second digital signal, comprising:
    a source of a write clock signal;
    a source of a read clock signal;
    means supplied with said read clock signal and responsive to a control signal for adjusting said read clock signal to yield an adjusted read clock signal;
    an elastic store having a data-in input, a data-out output, a write clock input and a read clock input, said write clock signal being supplied to said write clock input, said adjusted read clock signal being supplied to said read clock input, said first digital signal being supplied to said data-in input and said second digital signal being supplied as an output at said data-out output, said write clock signal being employed to generate write addresses for writing said first digital signal into said elastic store and said adjusted read clock signal being employed to generate read addresses for reading said second digital signal from said elastic store;
    means supplied with representations of said write clock signal and said read clock signal for generating a difference signal representative of the phase separation between them;
    means for low pass filtering said difference signal; and
    means supplied with said filtered difference signal for generating said control signal.

2. The apparatus as defined in claim 1 wherein said representations of said write clock signal and said adjusted read clock signal are the elastic store write address and read address signals, respectively.

3. The apparatus as defined in claim 1 wherein said means for low pass filtering includes means for sampling said difference signal and digital low pass filter means for filtering said sampled difference signal.

4. The apparatus as defined in claim 3 further including a source of a sample clock signal having a predetermined rate and wherein said means for sampling is responsive to said sample clock signal to sample said difference signal at said predetermined bit rate.

5. The apparatus as defined in claim 4 wherein said sample clock signal is synchronous with said read clock signal and wherein said predetermined sample clock rate is preselected so that jitter aliasing is minimized and so that any effect of overhead bit insertion in said second digital signal is substantially eliminated.

6. The apparatus as defined in claim 5 wherein said first digital signal is a gapped digital signal and said second digital signal is a smooth digital signal.

7. The apparatus as defined in claim 6 wherein said first digital signal is asynchronous and said second digital signal is synchronous.

8. The apparatus as defined in claim 7 wherein said first digital signal is a DS1 digital signal and said second digital signal is a sonet VT digital signal.

9. The apparatus as defined in claim 8 wherein said write clock signal has a bit rate equal to a DS1 digital signal bit rate and said read clock signal has a bit rate equal to a sonet VT1.5 digital signal bit rate.

10. The apparatus as defined in claim 9 wherein said sample clock signal predetermined rate is the synchronous sonet VT frame rate.

11. The apparatus as defined in claim 4 wherein said sample clock signal is synchronous with said write clock signal and wherein said predetermined sample clock rate is preselected so that jitter aliasing is minimized and any effect of overhead bit removal from said first digital signal is substantially eliminated.

12. The apparatus as defined in claim 11 wherein said first digital signal is a gapped digital signal and said second digital signal is a smooth digital signal.

13. The apparatus as defined in claim 12 wherein said first digital signal is synchronous and said second digital signal is asynchronous.

14. The apparatus as defined in claim 13 wherein said write clock signal has a bit rate equal to a sonet VT payload signal bit rate and said read clock signal has a bit rate equal to a ¼ DS2 signal bit rate.

15. The apparatus as defined in claim 14 wherein said sample clock signal predetermined rate is the synchronous sonet VT frame rate.

16. The apparatus as defined in claim 15 wherein said first digital signal in a sonet VT digital signal and said second digital signal is a DS1 digital signal.

17. Apparatus for converting a digital signal in a first digital signal format including associated overhead bits and a plurality of multiplexed first digital signals to a digital signal in a second digital signal format including associated overhead bits and a plurality of multiplexed second digital signals, comprising:
    means for demultiplexing said digital signal in said first digital signal format to obtain a plurality of said first digital signals and a corresponding plurality of first clock signals, said plurality of first clock signals being associated with said plurality of first digital signals on a one-to-one basis;

a plurality of synchronizer means for converting said plurality of first digital signals into said plurality of second digital signals, each of said synchronizer means being supplied one of said plurality of first digital signals and its corresponding one of said plurality of first clock signals, a second clock signal corresponding to the second digital signal which said first digital signal is being converted into and including means for generating said second clock signal, means supplied with said second clock signal and a second digital signal frame signal and being responsive to a control signal for adjusting said second clock signal to yield an adjusted second clock signal and for mapping an input data signal supplied thereto into said second digital signal, an elastic store having a data-in input, a data-out output, a write clock input and a read clock input, said first clock signal being supplied to said write clock input, said adjusted second clock signal being supplied to said read clock input, said first digital signal being supplied to said data-in input and said input data signal being supplied as an output at said data-out output, said first clock signal being employed to generate write addresses for writing said supplied one of said plurality of first digital signals into said elastic store and said adjusted second clock signal being employed to generate read addresses for reading said input data signal from said elastic store, means supplied with representations of said first clock signal and said adjusted second clock signal for generating a difference signal representative of the phase separation between them, means for low pass filtering said difference signal, and means supplied with said filtered difference signal for generating said control signal; and multiplexer means supplied with said plurality of second digital signals from said plurality of synchronizer means for forming said digital signal in said second digital format and for supplying said second clock signal and second frame signal to said plurality of synchronizer means.

18. The apparatus as defined in claim 17 wherein said representations of said first clock signal and said adjusted second clock signal are the elastic store write address and read address signals, respectively.

19. The apparatus as defined in claim 17 wherein said first clock signal is a DS1 clock signal and said second clock signal is a sonet VT1.5 clock signal.

20. The apparatus as defined in claim 17 wherein said means for low pass filtering includes means for sampling said difference signal and digital low pass filter means for filtering said sampled difference signal.

21. The apparatus as defined in claim 20 wherein said means for sampling is responsive to said second frame signal for synchronously sampling said difference signal.

22. The apparatus a defined in claim 21 wherein said first digital signal format is the the DS3 digital signal format, said first digital signal is the DS1 digital signal, said second digital signal format is the sonet STS1 format, said second digital signal is the sonet VT digital signal and the second frame signal is the sonet VT frame signal.

23. The apparatus as defined in claim 22 wherein said sonet VT digital signal is a sonet VT1.5 digital signal.

24. Apparatus for converting a digital signal in a first digital signal format including associated overhead bits and a plurality of multiplexed first digital signals to a digital signal in a second digital signal format including associated overhead bits and a plurality of multiplexed second digital signals, comprising:

means for demultiplexing said digital signal in said first digital signal format to obtain a plurality of said first digital signals, a corresponding plurality of first clock signals and a corresponding plurality of first frame signals, said plurality of first clock signals and first frame signals being associated with said plurality of first digital signals on a one-to-one basis;

a plurality of synchronizer means for converting said plurality of first digital signals into said plurality of second digital signals, each of said synchronizer means being supplied one of said plurality of first digital signals, its corresponding one of said plurality of first clock signals and its corresponding one of said plurality of first frame signals, a second clock signal corresponding to the second digital signal which said first digital signal is being converted and including means for generating said second clock signal, means supplied with said second clock signal and being responsive to a control signal for adjusting said second clock signal to yield an adjusted second clock signal and for mapping an input data signal supplied thereto into said second digital signal an elastic store having a data-in input, a data-out output, a write clock input and a read clock input, said first clock signal being supplied to said write clock input, said adjusted second clock signal being supplied to said read clock input, said first digital signal being supplied to said data-in input and said input data signal being supplied as an output at said data-out output, said first clock signal being employed to generate write addresses for writing said supplied one of said plurality of first digital signals into said elastic store and said adjusted second clock signal being employed to generate read addresses for reading said input data signal from said elastic store, means supplied with representations of said first clock signal and said adjusted second clock signal for generating a difference signal representative of the phase separation between them, means for low pass filtering said difference signal, and means supplied with said filtered difference signal for generating said control signal; and multiplexer means supplied with said plurality of second digital signals from said plurality of synchronizer means for forming said digital signal in said second digital format and for supplying said second clock signal to said plurality of synchronizer means.

25. The apparatus as defined in claim 24 wherein said representations of said first clock signal and said adjusted second clock signal are the elastic store write address and read address signals, respectively.

26. The apparatus as defined in claim 24 wherein said first clock signal is a sonet VT payload clock signal and said second clock signal is a ¼ DS2 clock signal.

27. The apparatus as defined in claim 24 wherein said means for low pass filtering includes means for sampling said difference signal and digital low pass filter means for filtering said sampled difference signal.

28. The apparatus as defined in claim 27 wherein said means for sampling is responsive to said first frame signal for synchronously sampling said difference signal.

29. The apparatus a defined in claim 28 wherein said first digital signal format is a STS1 digital signal format, said first digital signal is a sonet VT payload signal, said second digital signal format is a DS3 digital signal format, said second digital signal is a portion of a DS2 digital signal and said first frame signal is a sonet VT frame signal.

30. The apparatus as defined in claim 29 wherein said sonet VT payload signal is in a sonet VT1.5 digital signal format.

* * * * *